Sept. 22, 1931.    J. D. HUDSON    1,824,208
LIGHT
Filed May 11, 1929    3 Sheets-Sheet 1

INVENTOR.
J. D. Hudson.
BY E. J. Fetherstonhaugh
ATTORNEY.

Sept. 22, 1931.    J. D. HUDSON    1,824,208
LIGHT
Filed May 11, 1929    3 Sheets-Sheet 2

INVENTOR.
J. D. Hudson
BY E. J. Fetherstonhaugh
ATTORNEY.

Sept. 22, 1931.  J. D. HUDSON  1,824,208
LIGHT
Filed May 11, 1929   3 Sheets-Sheet 3
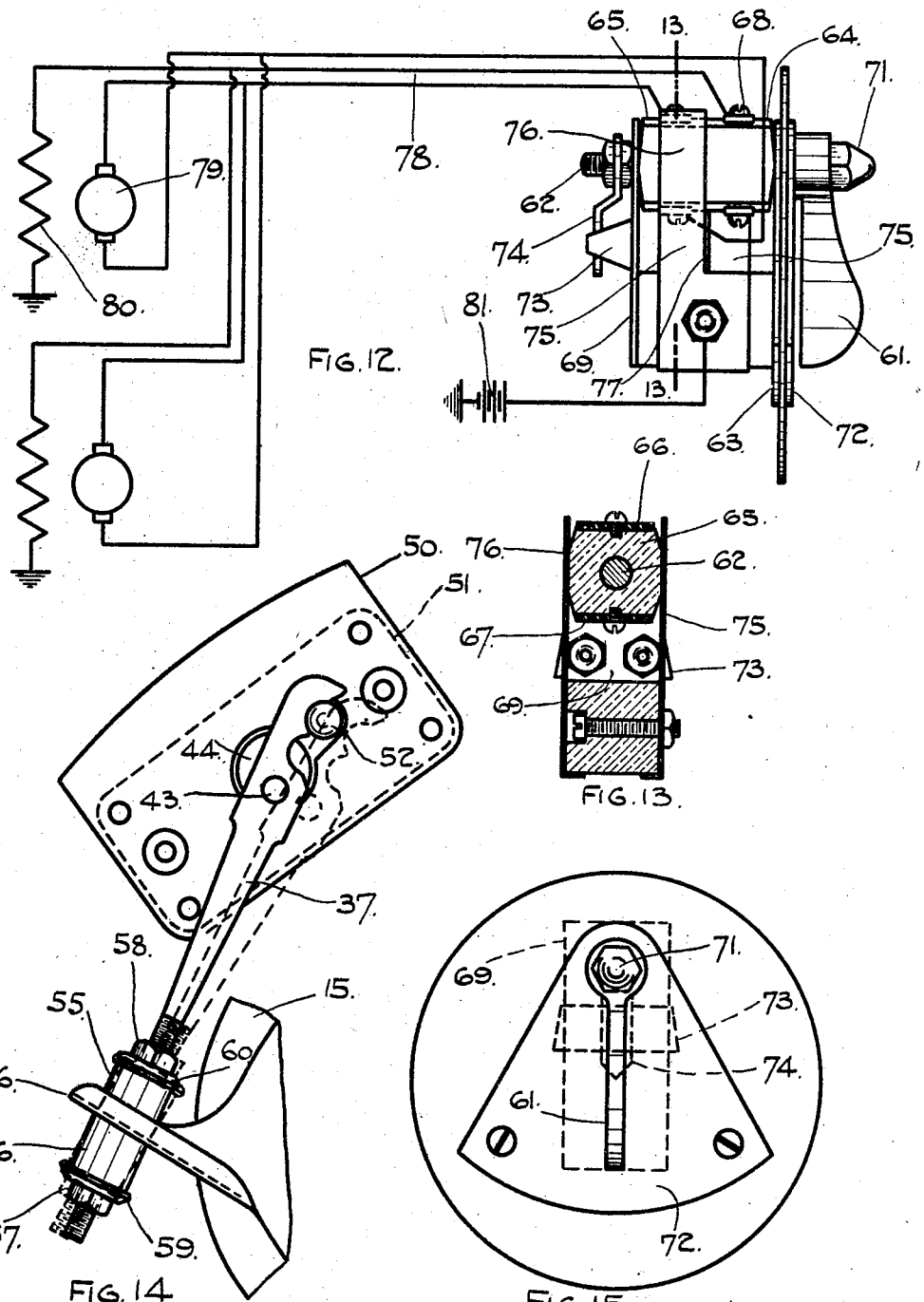
INVENTOR.
J. D. Hudson
BY E. J. Fetherstonhaugh
ATTORNEY.

Patented Sept. 22, 1931

1,824,208

UNITED STATES PATENT OFFICE

JAMES DAVIS HUDSON, OF MONTREAL, QUEBEC, CANADA

LIGHT

Application filed May 11, 1929. Serial No. 362,234.

The invention relates to lights, as described in the present specification and illustrated in the accompanying drawings that form part of the same.

The invention consists essentially of the novel features of construction pointed out broadly and specifically in the claims for novelty following a description containing an explanation in detail of an acceptable form of the invention.

The objects of the invention are to eliminate the glare particularly in headlights of vehicles so that the driver of an approaching vehicle shall not be blinded by the headlights of one coming from the opposite direction, and thereby insure the safety of lives and property due to collisions and ditching resulting from the misdirection of one or other of the vehicles through the lack of proper vision ahead; to effect this safety measure by means of a permanent lamp attachment which in no way causes a perceptible diminution of the light reflected either before or after the removal of the glare and which may be operated at the least possible drain on the source of electric power; to facilitate the operation of the light by the driver of the vehicle and completely obliterate the mechanical contrivances requiring the handling of levers and such like to change the position of the lamp where that may be required; to produce this contrivance at an extremely moderate cost so that it will be well within the reach of all motorists and vehicle owners, and at the same time simplify the construction of the parts and their arrangement in order that the maintenance charges shall be little or nothing during the life of the vehicle; to avoid rattle which is so important in the setting and operation of lamps on vehicles where the unevenness of the roadway and the running of machinery are bound to cause many jars and some vibration and still maintain freedom in operation, nothwithstanding the intimate association of the parts; to increase the efficiency of the shutter device and operating mechanism described in application for a patent filed under Serial No. 324,878 on December 10, 1928, and generally to provide in all kinds of lights where the removal of glare is an essential, a simple means of shading the light from the eyes and an efficient operating mechanism.

In the drawings, Figure 1 is a front elevational view of a vehicle headlight containing this invention.

Figure 12 is a diagrammatic view showing the wiring plan and an elevational view of the switch mechanism.

Figure 13 is a vertical sectional view of the switch mechanism on the line 13—13 in Figure 12.

Figure 14 is a detail of the crank operating mechanism and connecting rod showing a fragmentary view of the reflector crank arm and motor bracket, and the connecting rod and crank, and also showing in dotted lines the natural position of the connecting rod apart from the crank pin.

Figure 15 is a front elevational view of the switch handle and mounting.

Like numerals of reference indicate corresponding parts in the various figures.

Figure 2:
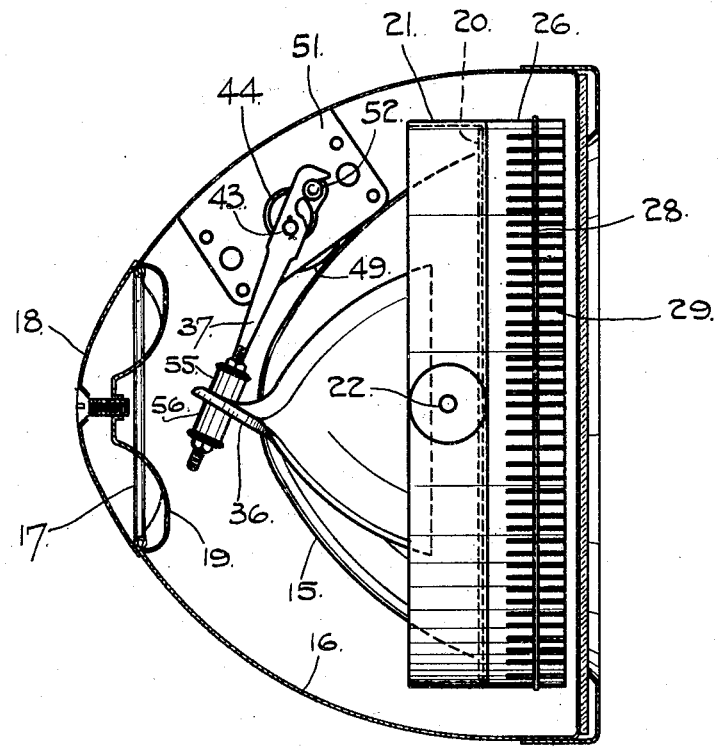
Figure 2 is a vertical sectional view of the headlight casing showing the shading members and the operating mechanism therewithin.
Figure 1:
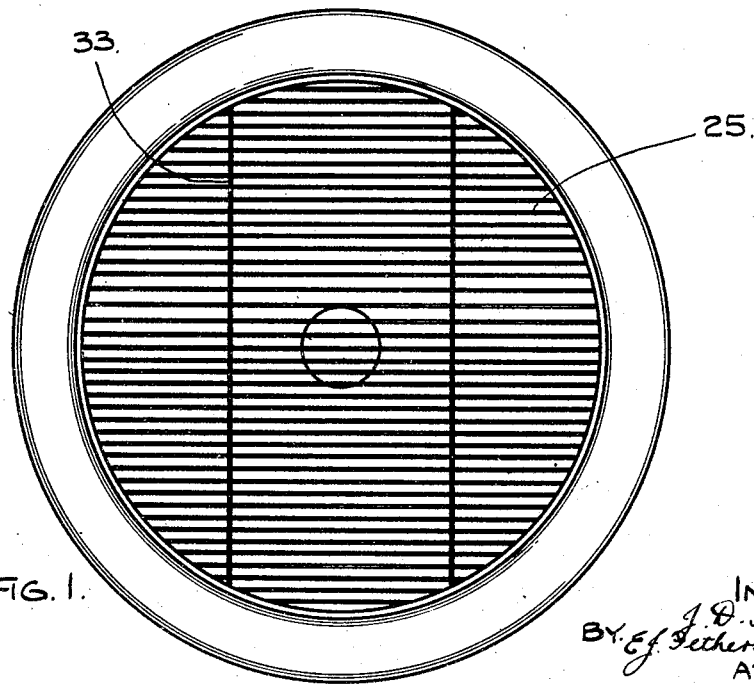
Figure 3:
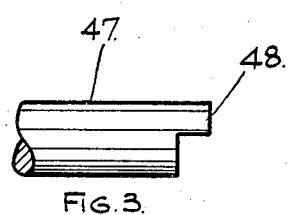
Figure 3 is a fragmentary detail showing the reduced end of an armature shaft of the operating electric motor.
Figure 4:
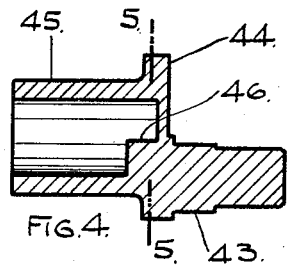
Figure 4 is a longitudinal sectional view of the operating crank receiving the reduced end of the armature shaft.
Figure 5:
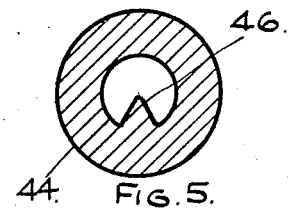
Figure 5 is a cross sectional view of the crank socket on the line 5—5 in Figure 4.
Figure 6:
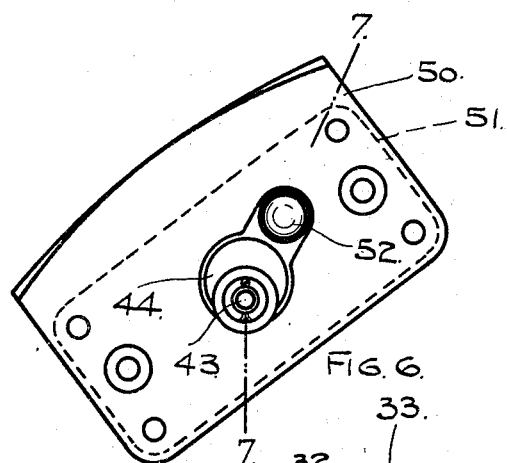
Figure 6 is a detail of the motor bracket adapted to be secured to the lamp casing.
Figure 7:
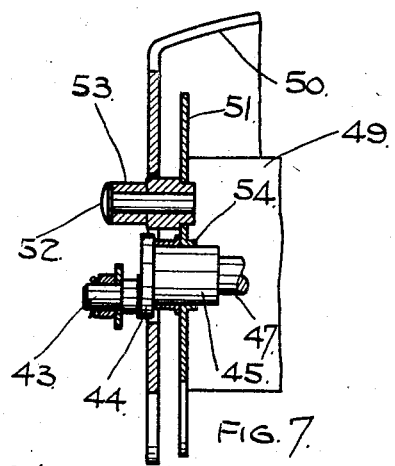
Figure 7 is a sectional detail on the line 7—7 in Figure 6.
Figures 8, 11:
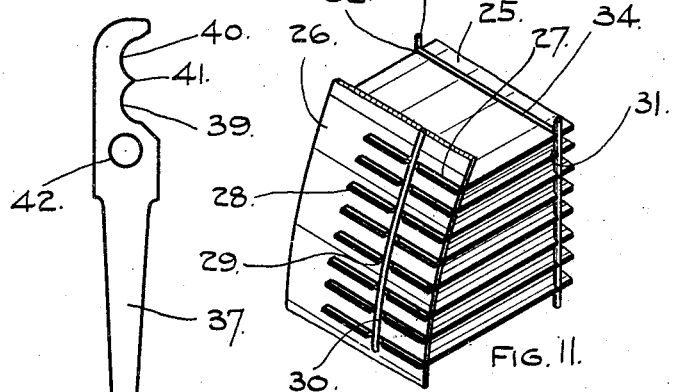
Figure 8 is an elevational detail of the connecting rod.
Figure 11 is a fragmentary detail of the shutter ring and shutters.
Figure 10:
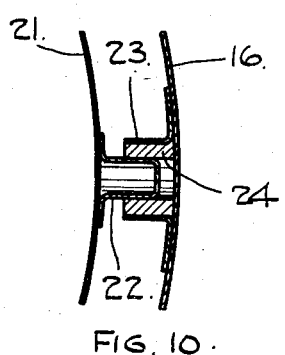
Figure 10 is a sectional detail of the reflector, trunnion and resilient mounting therefor.
Figure 9:
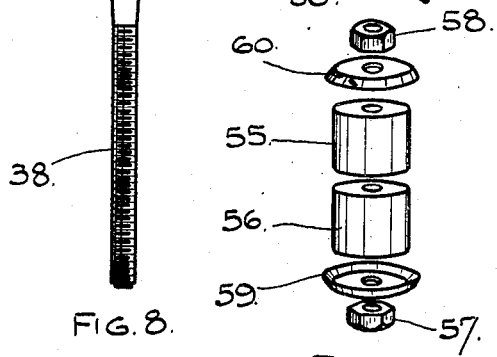
Figure 9 is a perspective detail of the locking nuts and resilient collars ready for mounting on the connecting rod.

In the particular art in which this invention is concerned there have been many devices invented to remove the glare which is a menace to safety throughout the highways of the world and amongst these devices various forms of dipping lights have been constructed and put into practice, and such lights have mitigated to some extent the nuisance and dangers incident to the glare. However dipping mechanisms and dipped reflectors have been largely in the field of experiments and in development necessarily slow, and it has been found that something more than the actual dipping of the reflector is required and that the reflector must be permanent and positive in each position. In so far as the addition to the reflector of the shutter plates is concerned the earlier application for a patent mentioned in the foregoing clearly brought out the initial movement in that direction in the way of fixed shutter plates in front of the reflector or as they may perhaps be more correctly called deflection plates and the present invention shows the development of this feature, while in the dipping mechanism a great advance is also shown and described in the electrical mechanism whereby, no matter what the position, the rigidity is assured.

Referring to the drawings, the reflector indicated by the numeral 15 is contained within the lamp casing 16, which has the access opening 17 centrally at the back thereof and the closure 18 held in position by the spring 19.

The reflector 15 is formed with the annular flange 20 to which the ring 21 is rigidly secured and from this ring 21 the trunnions 22 extend, one from one side and one from the other side, these trunnions extending into the bearings 23 rigidly secured to the casing and particularly into the rubber bushings 24 in which they are an extremely close fit, so that in the slow dipping of the reflector required in this invention the trunnion does not necessarily turn as the rubber is sufficiently resilient to yield with each forward movement of the reflector.

The shutter or deflection plates 25 are horizontally arranged and spaced in front of the reflector quite close together and filling in completely thereacross the front opening into the reflecting surface, and these deflection plates are supported in the ring 26 which is flanged and rigidly secured to the flanges of the reflector and of the ring 21.

The plate ring 26 is slotted inwardly from the front end forming the slots 27 transversely opposite to one another and the deflection plates 25 are reduced at their ends 28 and inserted through the slots 27 and at these reduced ends the notches 29 are made for the encircling wire 30 which effectually holds these plates firmly in order to avoid rattle.

The plates 25 are also notched at 31 at two or more places in their front edges and at 32 at two or more places at their rear edges and the wires 33 are strung in these notches and secured at their ends to the plate ring 26 both at the front and rear, and the front and rear wires are tied together at places by the tie wires 34.

This completes a very rigid mounting for the plates so that they are to all intents and purposes integral with the reflector itself and consequently will follow the movements of said reflector no matter what they may be.

The result of this is the light reflected by the reflector shines through the openings between the plates and is thus projected forwardly according to the position of the reflector itself, and it has been found in actual practice that there is no perceptible deterioration of the light and in fact if anything the projection of the light is materially improved while the effect of the shutter or deflection plates is that the rays of light are shaded, so that there is no actual upward throw of these rays directly from the lenses, and in fact the concentration is quite equal to the concentration without the deflection means if not materially improved. Wherever a driver is sufficiently elevated, that is to say, an approaching driver, there will be no glare at all except from a considerable distance even before the lamp is dipped, but where the approaching driver is on approximately the same level there is liability of glare and consequently it is desirable to dip the reflector so as to deflect the light and shade the projected light from the eyes of the approaching driver, thereby absolutely eliminating all glare without in any way affecting the usefulness of the headlights in so far as the roadway within a reasonable distance is concerned.

In the dipping of the reflector to effect the shading of the light the reflector is formed with or has attached there to a crank arm 35, which at the end is extended to form an upwardly inclined lug 36 having an orifice through which the connecting rod 37 extends.

The rod 37 is threaded at 38 where it extends through the lug 36, and at the other end thereof is formed with the adjoining pin slots 39 and 40 divided by the peak 41.

Adjacent to the slot 39 the crank pin orifice 42 extends through the connecting rod 37 and the crank pin 43 is free to turn therein and this crank pin 43 projects from the base 44 while the crank socket 45 is formed on the other side of said base 44.

This crank socket contains therein a segmental stop 46 which is engaged in either direction by the armature shaft 47, and particularly by the reduced end 48 of said shaft.

The armature shaft projects from and is operated by the electric motor 49 mounted on the bracket 50, one section of said bracket supporting the motor and the other section being secured to the lamp casing.

The base plate 51 carries the locking pin 52 which extends outwardly through a suitable opening in the bracket 50, and is encircled by the rubber sleeve 53.

The crank socket 45, which is cylindrical is journalled in the bearing 54 in the plate 51 and extends outwardly through a suitable opening in the bracket 50 so that the pin 52 forms a permanent resting place for the connecting rod 37 in one or other of the pin slots 39 or 40.

This connecting rod is continually pressing on the locking pin 52, and this pressure is accomplished by means of the rubber collars 55 and 56 mounted on the threaded end 38 of a connecting rod, one on either side of the upwardly inclined lug 36.

The nuts 57 and 58 are screwed against the caps 59 and 60 respectively and effect the desired pressure on the lug so that the neutral position of the connecting rod is beyond the pin 52, thus insuring the constant pressure desired and the effective locking of the rod in one position or in the other position.

The motor 49 is operated from the switch handle 61. The handle 61 is fixedly mounted on the pintle 62 extending through the corresponding orifice in the plate 63 and carrying beyond said plate the rotary switch members 64 and 65 also fixedly mounted and having the contacts 66 and 67 at the upper and lower ends of the rotary member 65, and the contact 68 at the upper end of the rotary member 64, these rotary members being contained between the front plate 63 and the back plate 69 and firmly secured by the nuts 70 screwed on to the rear end of the pintle and the head 71 of the pintle engaging the switch handle 61, which is spaced from the plate 63 by the segmental plate 72.

The stops 73 are suitably spaced and project from the back plate 69 and the arm 74 secured on the pintle operates with the movement of the pintle and consequently the movement of the switches between the stops, midway between the stops being the neutral position of the contacts.

The rotary members 64 and 65 carrying the contacts operate between the spring leaf contacts 75 and 76, the leaf 75 being cut away to form the longitudinal slot 77.

The operating circuit 78 for dipping and restoring the reflector in its two positions respectively has the switch contacts 66 and 67 introduced therein coacting with the contacts 75 and 76, and this circuit 78 includes the armature 79 of the motor as well as the field winding 80 connected through the contact 68 and the coacting leaf contact 76.

The electric battery 81 is connected to the leaf contact 75 and the field and battery are grounded.

It will be thus seen that to move the switch handle 61 in one direction from the central or neutral position the reflector is dipped, while to move it from a neutral position in the other direction the reflector is restored, to a straight position, and this is done by the reversing switch which reverses the flow of the current through the armature.

In the operation of the invention as applied to the modern motor vehicle, the headlights project the rays of light for a considerable distance ahead and in concentrating the rays the glare of the lights is blinding to anyone approaching the vehicle, so the shutter or deflection plates are introduced just in front of the reflector and the light shines through the horizontal openings between these plates.

The effect of this is equal if not greater concentration of the light, so that the beam of light is cast forward to a great distance and the loss of light through the introduction of these shutters in front of the reflector is really not perceptible.

In passing another vehicle the switch handle is operated to dip the reflector and in this operation the motor is energized through the electrical connections as aforesaid.

The energization of this motor which is a small affair such as is commonly used in horns and such like, rotates the armature shaft and as this armature shaft is introduced into the crank socket the said armature shaft revolves freely until it comes to the stop lug in said socket.

The necessary impetus is given the shaft to finish the operation by turning the crank, thus the drain on the battery through starting the crank movement from a state of inertia is very considerably reduced, as well as increasing the efficiency in the operation.

The crank simply has to raise the connecting rod over the peak between the pin slots therein and draw the connecting rod down into the companion slot, where it effectually locks the reflector to its dipped position.

There is as will be readily seen from the drawings and description a continuous pressure of the rod on the locking pin, therefore the reflector is held very rigid in its dipped position and besides this, the trunnions are stretching the rubber bushings, really contorting them, consequently through the resiliency of these bushings the tendency is for the reflector to return to its original straight position, in other words, to be restored to its normal state, but the connecting rod attached to the crank arm of the reflector forbids this and holds the reflector rigidly to its dipped position.

The switch handle has been meanwhile returned to its neutral position so that there is no current flowing in the operating circuit and the reflector is mechanically held, consequently to restore the reflector to its normal position the switch handle is moved over in the other direction from its neutral position, and this reverses the current, and consequently the direction of rotation of the armature shaft.

This shaft now engages the stop lug in the crank socket from the other side after rotating about seven-eighths of a turn in order to gain momentum to finish the operation and concludes its rotation by turning the crank and lifting the connecting rod from one pin slot to the other, that is to say, from the pin slot where it has been holding the reflector in its dipped position to the pin slot where it holds the reflector to its straight position.

The switch handle is then returned to neutral and the light remains shining straight ahead, of course the same mechanism is used in each headlight and the wiring simply duplicated, that is to say, taps the wires from one headlight to the other and the same switch handle operates both headlights in dipping.

What I claim is:—

1. In lights, a dipping reflector containing the light and mounted in suitable bearings and having a deflecting front and a crank arm extending rearwardly therefrom, a connecting rod having a threaded end extending through the inner end of said crank arm and resilient collars rigidly held and locked to engage in said crank arm, said connecting rod at the other end having adjacent pin slots and a crank pin orifice, an electric motor suitably supported adjacent to said reflector and having an armature shaft associated with the crank engaging in said connecting rod, and a locking pin from the support of said motor held in one or other of said slots by the pressure of said resilient collars.

2. In lights, a dipping reflector containing the light and mounted in suitable bearings and having a deflecting front and a crank arm extending rearwardly therefrom, a connecting rod having a threaded end extending from said crank arm, rubber collars engaging the crank arm, one on either side, and nuts and caps pressing said collars into close engagement with said crank arm, said connecting rod having a crank pin orifice towards the other end, and adjacent slots forming a peak therebetween, a motor bracket and motor supported thereby having a reduced end to its armature shaft, a crank journalled in said bracket and having a crank socket at the one end and an intermediate stop in said socket engaged by the reduced end of said armature shaft, at the other end a pin orifice in the connecting rod, a locking pin from said bracket engaging in one or other of the slots in the connecting rod and movable over the peak by said crank in one direction or the other, and electrical connections for reversing the operation of the motor in the dipping and restoring of the reflector respectively.

Signed at Montreal, Canada, this 23rd day of April, 1929.

JAMES DAVIS HUDSON.